June 12, 1934.  F. B. TOWNSEND  1,962,416
BASKET HANDLE
Filed April 27, 1933
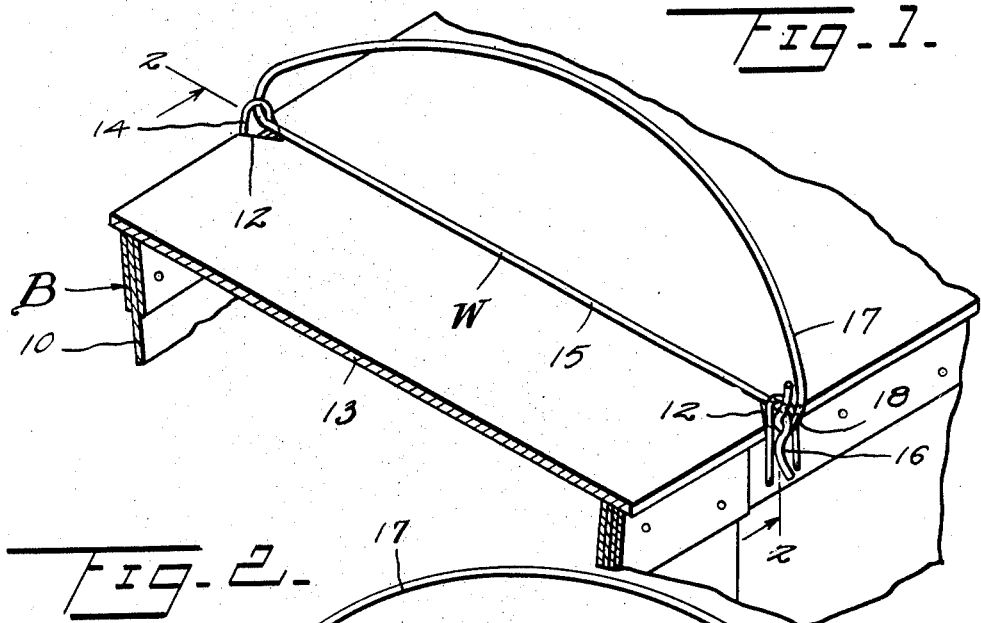
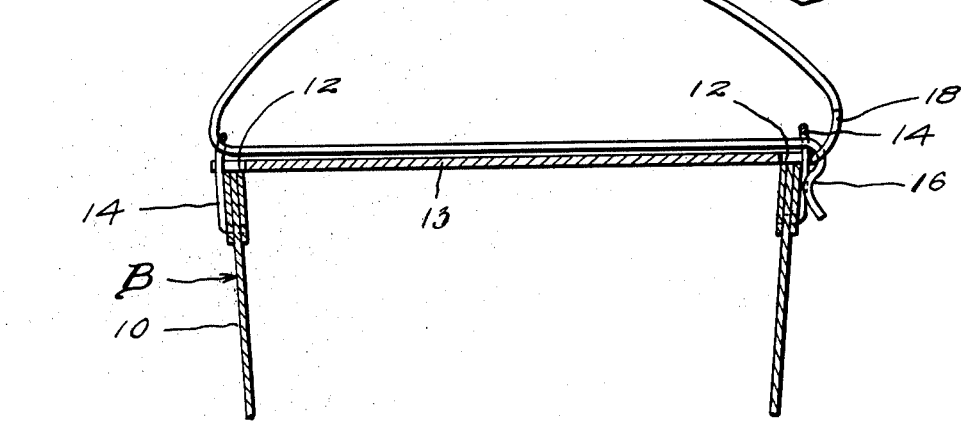
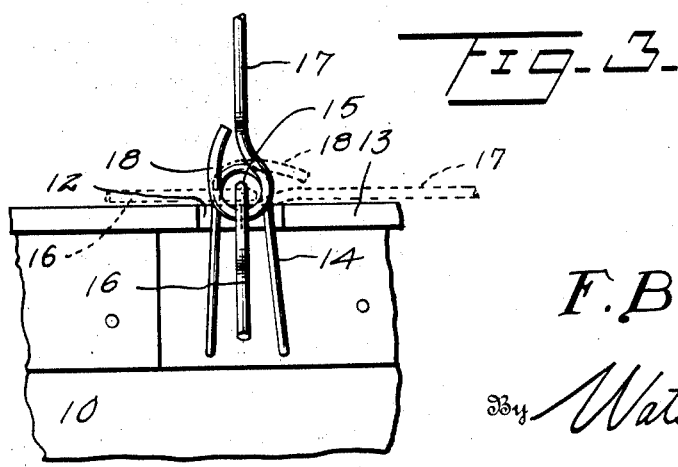
Inventor
F. B. Townsend
By Watson E. Coleman
Attorney Patented June 12, 1934

1,962,416

UNITED STATES PATENT OFFICE 1,962,416

BASKET HANDLE

Frank B. Townsend, Penn Yan, N. Y.

Application April 27, 1933, Serial No. 668,274

5 Claims. (Cl. 217—125)

This invention relates to baskets and more particularly to an improved handle for a berry or fruit basket.

An object of this invention is to provide an improved handle structure for use with a conventional basket structure for the holding of fruit or the like, which is so constructed that it will not only provide a handle for the basket but will also provide means for releasably securing the cover on the top of the basket.

Another object of this invention is to provide a handle structure of this kind which is so constructed that it may be made of relatively light material and which is adaptable to varying sizes or widths of baskets and which will not become disengaged from the basket while the basket is being carried in the hand.

A further object of this invention is to provide a carrying handle which can be easily mounted on a basket and which can also be easily disengaged from the basket, the handle having means whereby the weight of the basket while it is being carried by the handle will prevent the basket from being loosened or disengaged from the handle.

The above and various other objects and advantages of this invention will in part be described and in part be understood from the following detailed description of the present preferred embodiment, the same being illustrated in the accompanying drawing wherein:—

Figure 1 is a fragmentary perspective view of a basket having a handle constructed according to the preferred embodiment of this invention.

Figure 2 is a sectional view taken on the line 2—2 of Figure 1.

Figure 3 is a fragmentary enlarged side elevation of the basket handle.

Referring to the drawing wherein like characters of reference designate corresponding parts throughout the views, the letter B designates generally a conventional basket which is used in the shipment or dispensing of fruit, the basket including side walls 10, and a cover 13. This cover 13 is of the removable type and may be provided at the desired point along the length thereof with notches 12 adjacent the center so that when the handle hereinafter described is attached to the basket B, the cover or lid 13 will not move longitudinally of the top of the basket.

The basket B is provided at substantially the center with a pair of loops 14 which are positioned one on each side 10 of the basket, and these loops extend above the top or rim of the basket. These loops 14 are constructed of a single length of wire which is looped upon itself and the two ends are bent inwardly and clinched against the inside of the wall 10.

A handle structure and cover securing means comprising a single length of wire W is extended through the loops 14 and extends above the lid 13. This wire W comprises a relatively straight cover engaging portion 15 which is provided at one end with a substantially S-shaped hook or extension 16.

This hook or extension 16 is adapted to extend through one of the loops 14 and downwardly over the side wall 10 of the basket. The opposite end of the relatively straight portion 15 is bent upon itself, as at 17, to provide a carrying handle, and this bent or reverted portion 17 is initially so positioned relative to the straight portion 15 that this straight portion 15 may be formed of any desired length, thereby adapting the wire W to varying widths of baskets.

The handle portion 17 terminates in a loop or eye 18 which is positioned initially in spaced relation to the hook 16 and is bent inwardly so that when the handle portion 17 is pressed downwardly toward the hook 16, the loop or eye 18 will slide over the curved portions of the hook 16 and snap behind the free or outturned lower end portion of the hook 16. In this manner, the eye 18, after passing the outturned end of the hook 16, may be pulled upwardly, and when in operative position, will be in the loop formed between the upper end of the hook 16 and the adjacent end of the straight portion 15.

By providing a handle and cover retaining means as hereinbefore described, the handle may be made of relatively light material which will readily bend but which will, in a measure, retain the desired shape, the wire having a degree of resiliency but at the same time being bendable so that it will conform to varying sizes of baskets.

In the use of this device, the wire W is initially formed with the hook 16 at one end and the eye or loop 18 at the opposite end. The eye 18 is bent in the direction opposite from the hook 16. The wire W may then be passed through the loops 14, the hook 16 passing through these loops and engaging in one side of the basket B. If desired, the cover or lid may be slipped beneath the straight portion 15 with the cut-out portions 12 confronting the loops 14. The handle portion 17 may then be formed by bending the wire W upwardly and forming this handle portion 17 on a curvature so that the eye 18 will be in a position for engagement with the hook 16. When the eye 18 is engaged with the hook 16, the cover or lid 13 is locked on the top of the basket and the handle 17 may be grasped and the basket carried in the conventional manner. The weight of the material in the basket will have a tendency to hold the eye 18 and the hook 16 in locked position.

As will be readily seen from Figure 3, the handle 17 may be collapsed or oscillated to a lowered position where it will contact with the lid 13. By this means a number of the baskets may be conveniently stacked one upon the other without interference from or damage to the handle.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A basket handle and cover securing means comprising a single length of wire having a relatively straight cover engaging portion terminating at one end in a substantially S-shaped hook adapted to engage on one side of a basket and to be projected through a loop carried by the basket, a handle portion integral with the opposite end of the straight portion and extending upwardly through a second loop carried by the basket on the side opposite from the first loop, an eye formed with the free end of the handle, said eye being inclined inwardly and adapted to receive therein the hook.

2. In combination with a basket having a pair of carrying loops on opposite sides thereof, a handle comprising a single length of wire having a straight cover engaging portion extending at each end through the pair of loops, a substantially S-shaped hook formed with one end of the straight portion, a reverted bail formed with the opposite end of the straight portion and extending above the loops, and an eye integral with one end of the bail portion and positioned for engagement with the hook, said eye being inclined inwardly to facilitate engagement thereof with the hook.

3. A basket handle and cover securing means comprising a single length of wire having a relatively straight cover engaging portion terminating at one end in a hook adapted to engage on one side of a basket and to be projected through a loop carried by the basket, a handle portion integral with the opposite end of the straight portion and extending upwardly through a second loop carried by the basket on the side opposite from the first loop, and an eye formed with the free end of the handle, said eye releasably engaging said hook outwardly of said first loop.

4. In combination with a basket having a pair of carrying loops on opposite sides thereof, a handle comprising a single length of wire having a straight cover engaging portion extending at each end through the pair of loops, a hook formed with one end of the straight portion and extending downwardly, a reverted bail formed with the opposite end of the straight portion and extending above the loops, and an eye integral with one end of the bail and releasably engaging said hook.

5. As a new article of manufacture, a handle bail for a receptacle having a removable cover and having looped members secured to the opposite sides extending outwardly beyond the applied cover, said bail comprising a single length of wire having a cover engaging portion terminating at one end in a hood adapted to engage on one side of the receptacle and to be projected through one of said loops, a handle portion integral with the opposite end of the cover engaging portion and extending upwardly from the other loop on the receptacle and in the direction of the first loop, and an eye formed with the free end of the handle, said eye releasably engaging said hook outwardly of said first loop.

FRANK B. TOWNSEND.